United States Patent [19]
Brown

[11] Patent Number: 5,576,054
[45] Date of Patent: Nov. 19, 1996

[54] SILICONE RUBBER COMPOSITIONS

[75] Inventor: Peter Brown, Nr. Warrington, England

[73] Assignee: General Electric Company, Pittsfield, Mass.

[21] Appl. No.: 373,483

[22] Filed: Jan. 17, 1995

Related U.S. Application Data

[63] Continuation of Ser. No. 76,374, Jun. 14, 1993, abandoned, which is a continuation of Ser. No. 856,280, Mar. 23, 1992, abandoned, which is a division of Ser. No. 368,963, Jun. 19, 1989, abandoned, which is a continuation of Ser. No. 116,741, Mar. 2, 1988, abandoned, which is a continuation of Ser. No. 6,038, Jan. 22, 1987, abandoned.

[30] Foreign Application Priority Data

Jan. 21, 1986 [GB] United Kingdom .................. 8601344
Jan. 27, 1986 [GB] United Kingdom .................. 8601874

[51] Int. Cl.$^6$ ..................................................... B05D 5/06
[52] U.S. Cl. ...................... 427/160; 427/165; 427/387; 427/389.7
[58] Field of Search ...................... 427/160, 387, 427/389.7, 165

[56] References Cited

U.S. PATENT DOCUMENTS

| | | | |
|---|---|---|---|
| 3,527,655 | 9/1970 | Ballard | 525/478 |
| 3,888,815 | 6/1975 | Bessemer et al. | 260/37 |
| 4,191,817 | 3/1980 | Schiller et al. | 528/38 |
| 4,438,169 | 3/1984 | Daniels et al. | 428/206 |
| 4,483,973 | 11/1984 | Lucas et al. | 528/21 |
| 4,489,199 | 12/1984 | Wengrovius | 528/34 |
| 4,513,061 | 4/1985 | Kawakubo et al. | 428/429 |
| 4,528,314 | 7/1985 | Modic | 525/478 |

FOREIGN PATENT DOCUMENTS

| | | |
|---|---|---|
| 0130731 | 9/1985 | European Pat. Off. . |
| 2023628 | 1/1980 | United Kingdom . |

*Primary Examiner*—Janyce Bell
*Attorney, Agent, or Firm*—Finnegan, Henderson, Farabow, Garrett & Dunner

[57] ABSTRACT

The invention described is a silicone rubber composition useful as an opacifying coating comprising a organopolysiloxane and an opacifier. The opacifying coating is particularly useful as an opacifying layer on translucent material such as glass.

8 Claims, No Drawings

SILICONE RUBBER COMPOSITIONS

This application is a continuation of application Ser. No. 08/076,374, filed Jun. 14, 1993, now abandoned, which is a continuation of application Ser. No. 07/856,280, filed Mar. 23, 1992, abandoned, which is a divisional of application Ser. No. 07/368,963, filed Jun. 19, 1989, abandoned, which is a continuation of application Ser. No. 07/116,741, filed Mar. 2, 1988, abandoned, which is a continuation of application Ser. No. 07/006,038, filed Jan. 22, 1987, abandoned.

The present invention relates to a room temperature vulcanizable silicone rubber composition and in particular the present invention relates to a self-bonding two-package room temperature vulcanizable silicone rubber opacifying composition.

BACKGROUND OF THE INVENTION

Modern buildings are often designed with a complete glass frontage. The "all glass" buildings use the same glass, often solar reflecting glass, for constant visual effect across the aspects of the building. However, the building is made up of vision glass (i.e. see through glass) and spandrel glass (i.e. glass which covers the building structure), The problem with spandrel glass is that it must look the same as vision glass during daylight hours to ensure the architect's visual design requirements for the building are met. The spandrel glass provides a panelling, for example, between floors to hide the structure of the building. As a consequence, the spandrel glass is subjected to harsh environmental conditions including direct exposure to UV light and, because of the lack of ventilation, glass temperatures of 100° C. and more during exposure by the sun. During the night hours the glass temperature may fall to −10° C. or lower, depending on ambient atmospheric conditions.

Various types of spandrel glasses have been used. For example, it may be a single sheet or a hermetically sealed insulating glass unit with an enamel coating on the inner side and an insulating glass panel behind. The disadvantages of insulating glass units are high cost, weight and appearance. Changes in temperature or pressure flex the glass and visible distortion in reflective images can occur.

Single glass panels can be enamelled particulary for solid colours. However, the architectual trend is towards all glass solar reflecting walls. This mirror type glass cannot be enamelled. Polyethylene film can be heat bonded to solar reflecting glass. However, although it can be effective, it is very difficult to apply the polyethylene without air bubbles. Other ways of overcoming the problem include the use of insulating foam or mineral wool closely adjacent to the glass. The main disadvantage of the latter systems is that under certain lighting conditions light passage can occur giving a non-pleasing effect to the outside of the building. In addition, the insulation can be displaced, volatile deposits or condensation staining can occur and damage the mirror surface spoiling the visual effect of the building.

GB1394206 (corresponding to U.S. Pat. No. 3,888,815) describes a two package room temperature vulcanizable composition which is useful as a roof coating material. During such use the two parts of the composition are mixed and applied to the roof by means of a spray gun. On mixing and application to the roof the material cures providing protection to the roof. The material successfully bonds to materials such as aluminium concrete, wood and stainless steel. In use, the thickness or bulk of composition also provides protection not only to the roof but also to the bond between the roof and the bulk of the material.

U.S. Pat. No. 3,813,364 describes a self-bonding heat vulcanizable silicone rubber composition which is self-bonding to various substrates such as plastics, metals or glass.

GB1278798 and GB1381933 describes silicone rubber compositions which are curable at moderate temperatures to produce a silicone rubber which bonds strongly to surfaces with which it is in contact with during curing.

The present invention attempts to provide a coating which can be attached or bonded to a translucent material and in particular to solar reflecting glass on the inside of the glass when in use. The coating will need to meet extreme bonding requirements as the bond of the coating to the substrate will be exposed to extremes of, for example, temperature and UV light without the protection of the bulk of the coating. The purpose of the bulk of the coating is to provide consistent opacity to the translucent material.

According to the present invention, there is provided a curable silicone rubber composition and an opacifier present in 0.1% to 35% by weight of the organopolysiloxane contained in the silicone rubber composition.

The present invention also provides a curable silicone rubber composition and an opacifier present in 0.1% to 35% by weight of the organopolysiloxane contained in the silicone rubber composition, the silicone rubber being coated onto a translucent sheet material and cured.

In a further aspect, the present invention provides a method of coating a surface of a translucent material to stop light transmission by the translucent material, which method comprises applying the opaque curable silicone rubber composition to the translucent material and curing the silicone composition.

The silicone rubber composition may be a room temperature vulcanizable silicone rubber composition or may be a heat-curable silicone rubber composition.

The important aspect of the present invention is the opacifier further described below. In addition, filler may also be added to the composition.

DETAILED DESCRIPTION OF THE INVENTION

Briefly, according to the present invention there is provided a curable silicone rubber composition and an opacifier present in an amount of 0.1% to 35% by weight of the organopolysiloxane contained within the silicone rubber composition. Of course, the silicone rubber composition may be either a room temperature vulcanizable silicone rubber composition or a heat curable silicone rubber composition, including electron beam radiation cured and the like.

In one embodiment, the silicone rubber may be a room temperature vulcanizable silicone rubber composition comprising
  (a) a linear, organopolysiloxane containing terminal silicon-bonded hydroxy groups and having a viscosity of 500 to 10,000,000 centipoises when measured at 25° C. the organic groups of the aforesaid organopolysiloxane being substituted or unsubstituted monovalent hydrocarbon radicals,
  (b) from 0.1 to 15% by weight, based on organopolysiloxane, of
    (1) an organoxysilane or silicate corresponding to the general formula, $$(RO)_3Si-R^1 \qquad (1)$$

where R is a monovalent hydrocarbon or halogenated hydrocarbon radical and $R^1$ is an alkyl, haloalkyl, aryl, haloaryl, alkenyl, cycloalkyl, cycloalkenyl, cyanoalkyl, alkoxy or acyloxy radical, or (2) a liquid partial hydrolysis product of the aforementioned organoxy silane or silicate compounds, (c) from 0.1 to 5% by weight, based on the organopolysiloxane, of a catalyst which is metal salt of an organic monocarboxylic or dicarboxylic acid in which the metal ion is lead, tin, zirconium, antimony, iron, cadmium, barium, calcium, titanium, bismuth or manganese, and (d) from 0.1 to 10% by weight, based on the organopolysiloxane, of a nitrogen-containing silane of the formula:

  (2)

where R is a monovalent hydrocarbon or halogenated hydrocarbon radical, Q is an alkoxy, phenoxy, halo, amino or dialkylamino group, and Q' is a saturated, unsaturated or aromatic hydrocarbon residue substituted by at least one amino hydrazone, azirane or, cyano group, and optionally one or more thio, sulphone, oxa, oxo, diorganosilicon and/or ester groups, and a is 0, 1 or 2.

These compositions are self-bonding, i.e. they do not require the use of a primer. The presence of the nitrogen-containing silane in an amount of 0.1 to 10% by weight, based on the linear organopolysiloxane (a) imparts the desired self-bonding properties to the room temperature vulcanizable silicone composition. The nitrogen-containing silane (d) acts both as a self-bonding agent and as a catalytic agent in the composition. The composition, however, also contains an additional catalyst (c) constituted by from 0.1 to 5% by weight, based on organopolysiloxane, of a catalyst which is a metallic salt of an organic monocarboxylic or dicarboxylic acid in which the metal ion is lead, tin, zirconium, antimony, iron, cadmium, barium, calcium, titanium, bismuth or manganese. Preferred nitrogen containing silanes (d) have the formula,

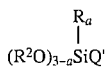  (3)

where $R^2$ is a monovalent hydrocarbon or halogenated hydrocarbon radical of up to 10 carbon atoms, most preferably an alkyl radical of 1 to 5 carbon atoms; a has the meaning given above and preferably has a value of 0.

The present composition may additionally include a branched or straight polymer compound of $(R^3)_2SiO$ units, $(R^3)SiO_{1/2}$ units and $R^3SiO_{3/2}$ units having a 0.05 to 8% by weight, preferably 0.1 to 8% by weight of hydroxy radicals (the viscosity of the polymer being preferably between 500 to $1.0 \times 10^5$ centipoise at 25° C.). The ratio of the organosiloxy units to the diorganosiloxy units is from 0.11 to 1.4 and the ratio of the triorganosiloxy units to the diorganosiloxy units is from 0.02 to 1, inclusive.

The preferred linear fluid organopolysiloxane containing terminal silicon-bonded hydroxy groups and having a viscosity of 500 to 10,000,000 centipoises when measured at 25° C., has preferably the formula,

  (4)

where $R^3$ is a monovalent hydrocarbon or halogenated hydrocarbon radical and r is a whole number from 250 to 7,275. The radicals R, $R^2$, and $R^3$ are preferably alkyl radicals, such as methyl, ethyl, propyl, butyl or hexyl; aryl radicals such as phenyl, or diphenyl; alkaryl radicals such as tolyl, xylyl, or ethylphenyl; aralkyl radicals such as benzyl, or phenylethyl; haloaryl and haloalkyl such as chlorophenyl, tetrachlorophenyl, or difluorophenyl; and alkenyl radicals such as vinyl or allyl. Further, $R^3$ may also represent cyanoalkyl, cycloalkyl or cycloalkenyl radicals. The $R^3$ groups attached to a single silicon radical may be the same groups or different groups. It has been found that at least 50% and preferably 70 to 100% of the $R^3$ groups in the diorganopolysiloxane molecule should be methyl, Further, the diorganopolysiloxane can be a homopolymer, or a copolymer having different types of units in the chain such as dimethyl, diphenyl, or methyl-phenyl.

The organopolysiloxanes of formula (4) may also be represented by the average unit formula,

  (5)

where $R^3$ is defined above and the value of m may vary from 1.99 to 2. The above average unit formula only represents organopolysiloxanes having monofunctional terminal groups and optional trifunctional units. However, in the present case, it is preferred that the terminal groups be hydroxy and the monofunctional and trifunctional groups be kept to a minimum.

In order for the diorganopolysiloxane fluids to cure there must be present in the composition the cross-linking agent of formula (1). In that formula, R groups may be alkyl radicals such as methyl, ethyl, propyl, isopropyl, butyl, amyl, isoamyl, octyl, isooctyl, decyl, or dodecyl; haloalkyl such as the chlorinated, brominated, or fluorinated alkyl radicals, In addition, R may represent aryl, aralkyl and alkenyl radicals such as vinyl, allyl, phenyl, tolyl, xylyl, benzyl, phenylethyl, naphthyl, anthracyl, or biphenyl, as well as the halogen-substituted derivatives of the above radicals. In addition, R may represent cycloalkenyl, cycloalkyl and cyanoalkyl radicals. The radical $R^1$ represents the same radicals as R and, in addition, preferably represents alkoxy or aryloxy radicals such as methoxy, ethoxy, butoxy and phenoxy.

Alternatively to the monomeric compounds of formula (1), liquid partially hydrolyzed products thereof can also be used as cross-linking agents. Such hydrolysis products are obtained by effecting partial hydrolysis in water of the particular monomeric compound in the presence of small amounts of acid to a point where it is still water-insoluble and still possible to isolate a liquid partially hydrolyzed organosilicon compound. Thus, the ethyl silicate having the formula $(C_2H_5O)_4Si$ may be partially hydrolyzed by adding acids or acid-forming metal salts, such as $FeCl_3$, $CuCl_2$, $AlCl_3$, or $SnCl_4$ to the liquid monomeric organosilicate, and thereafter effecting suitable hydrolysis of this mixture of ingredients in water to obtain the two-phase composition, from which the water-insoluble, partially hydrolyzed organosilicate can readily be separated from the aqueous phase and catalyst. A partially hydrolyzed ethyl silicate is sold under the tradename Ethyl Silicate-40, by Union Carbide Corporation.

There is added from 0.1 to 15.0% by weight of the cross-linking agent of formula (1) (or its hydrolysis product)

and preferably 0.1 to 10% by weight, based on the weight of the diorganopolysiloxane of formula (4) and (5). If more than 15.0% by weight of cross-linking agent were to be used, the excess would not function as a cross-linking agent since the initial hydroxy positions on the organopolysiloxane would already have reacted with the cross-linking agent and the excess would act as a filler, reducing the elasticity of the cured silicone rubber composition. If less than 0.1% by weight of cross-linking agent were to be used, there would not be sufficient cross-linking agent to react with the organopolysiloxane to form the cured silicone rubber.

Although the above mentioned cross-linking agents must be used, there may additionally be used as cross-linking agents, organopolysiloxane resins having a functionality greater than 2 and preferably greater than 2.5. The organopolysiloxane resins are methylsiloxanes, or resins which contain both monomethyl and dimethyl or monophenyl units. There may also be used ethylsiloxane resins, in which the ratio R"Si is 1.4 to 1 and which contains 15 mol % of butoxy groups, or there may be used resins in which the ratio R"Si is 1.1 to 1 and which contain 10 mol % of methoxy groups or there may be used methylphenylsiloxane resins containing 50 mol % of monomethyl units, 25 mol % of dimethyl units and 25 mol % of monophenyl units.

Other suitable additional cross-linking agents are organohydrogenpolysiloxanes of the formula, $$R^{37}_a HSiO_{\frac{3-a}{2}} \quad (6)$$

in which $R^{37}$ is an alkyl or aryl radical and a is a number less than 2, but is not zero. The organohydrogenpolysiloxane cross-linking agents have the disadvantage that during curing there is evolved hydrogen gas which can result in bubbles being trapped in the silicone rubber composition. Although the above cross-linking agents can be used in the compositions, the organosilicates of formula (1) for their partial hydrolysis products must be present since the processability of the composition is facilitated and the cured silicone rubber composition has better physical properties. A more detailed description of these other cross-linking agents is to be found in U.S. Pat. No. 3,127,363.

The other essential component in this silicone rubber composition is a catalyst. It has been found that only certain metallic salts of organic carboxylic acids and dicarboxylic acids, in addition to the nitrogen-containing silanes of formula (2), may be employed with the organopolysiloxanes of formula (4) and (5) as a curing catalyst. Suitable acid radicals are the resinate, linoleate, stearate, and oleate, as well as the lower radicals such as acetate, butyrate, and octoate. Metallic salts of lauric acid have been found to be especially effective. The metal ion of the metal salt is lead, tin, zirconium, antimony, iron, cadmium, barium, calcium, titanium, bismuth or manganese. Thus, examples of suitable metallic salt catalysts are tin naphthenate, lead octoate, tin octoate, iron stearate, tin oleate, antimony octoate, tin-butyrate, basic dibutyl tin laurate and dibutyl tin dilurate. The tin and lead salts are preferred since they are usually soluble in the diorganopolysiloxanes of formulae (4) and (5) and since they have enhanced catalytic activity in combination with the alkyl silicate. It is important to note that other compounds which would be expected to exercise good catalytic activity in the mixture of diorganopolysiloxane, filler and alkyl silicate. It is important to note that other compounds which would be expected to exercise good catalytic activity in the mixture of diorganopolysiloxane, filler and alkyl silicate exercise no catalytic activity whatsoever. This class of compounds are zinc salts of organic acids, cobalt oleate, cobalt naphthenate, manganese naphthenate, nickel naphthenate and calcium stearate. From 0.1 to 5% by weight of the metallic salt is used, based on the weight of the diorganopolysiloxane.

Various heat curable silicone rubber compositions may also be used. These compositions may comprise, by weight (1) 100 parts of a liquid vinyl chain-stopped polysiloxane having the formula

where $R^{10}$ and $R^{12}$ are each an alkyl radical containing from 1 to 8 carbon atoms, a mononuclear aryl radical, a cycloalkyl radical having from 5 to 7 ring carbon atoms or a mononuclear aralkyl radical of which the alkyl radical(s) contain(s) from 1 to 8 carbon atoms with at least 50 mole per cent of the R' radicals being methyl and where n has a value sufficient to provide a viscosity of 1,000 to 750,000 centistokes at 25° C. preferably from 50,000 to 150,000 inclusive, (2) from 0 to 50, preferably from 20 to 50 parts of an organopolysiloxane copolymer comprising $(R")_3SiO_{0.5}$ units, $(R")_2SiO$ units and $SiO_2$ units, where each R" is a vinyl radical, an alkyl radical containing from 1 to 8 carbon atoms, a mononuclear aryl radical, a cycloalkyl radical having from 5 to 7 ring carbon atoms or a mononuclear aralkyl radical of which the alkyl radical(s) contain(s) from 1 to 8 carbon atoms, where the ratio of $(R")_3SiO_{0.5}$ units to $SiO_2$ units is from 0.5:1 to 1:1, and where from 2.5 to 10 mole per cent of the silicon atoms contain silicon-bonded vinyl groups, (3) a catalyst comprising platinum and/or a platinum compound in an amount sufficient to provide from $10^{-3}$ to $10^{-6}$ gram atoms of platinum per mole of silicon-bonded vinyl radicals in the composition, (4) an amount of a liquid organohydrogenpolysiloxane having the formula:

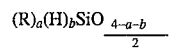

sufficient to provide from 0.5 to 1.2 and preferably 1.0 silicon-bonded hydrogen atom per silicon-bonded vinyl group in the composition described in (1), where R is as previously defined, a has a value of from 1.00 to 2.00, b has a value of from 0.1 to 1.2, preferably 0.1 to 1.0, and the sum of a plus b is from 2.00 to 2.67, there being at least two silicon-bonded hydrogen atoms per molecule, (5) from 0.1 to 1 part of a liquid vinyl siloxane hydrolyzate of the formula:

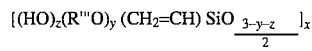

preferably prepared by the hydrolysis of a mixture of vinyl trichlorosilane and a vinyl trialkoxysilane, such as vinyl triethoxysilane, where R''' is an alkyl radical having one to 8 carbon atoms, x is a number greater than 3, y has a value of from 0.01 to 0.4, and preferably has a value of 0.05 to 0.1 and z has a value of 0.1 to 0.4, preferably from 0.2 to 0.4, (6) from 0 per cent to 85 per cent, based upon the total weight of the above described mixture, of a halocarbon catalyst inhibitor which is a halocarbon having 2 carbon atoms and at least 3 halogen substituents, said halogen substituents having an atomic weight of less than 126 and being positioned anywhere on the molecule.

When a completely transparent laminate is desired, the fluid vinyl siloxane hydrolyzate of (5) is not mixed into the compositions but can be used to prime the transparent surfaces to be joined. The hydrolyzate is usually applied to the surfaces in an ethyl alcohol solution containing from 3 to 6 per cent by weight of the hydrolyzate.

The compositions are prepared by mixing in a suitable fashion all of the components described above plus any additional components such as will be described subsequently and maintaining the mixture at a temperature at which it is to be cured. The compositions cure at temperatures which can vary from about 50° C. or lower to temperatures of the order of 110° C. or higher depending upon the particular amount of platinum compound catalyst present in composition and depending upon the time which is allowed for cure. Likewise, the compositions can be prevented from curing by maintaining them at a reduced temperature such as a temperature of 0° C. in which case all of the components can be kept together for extended periods of time without curing. The compositions can also be prevented from curing by the utilization of the above described halocarbon catalyst inhibitor.

The compositions can vary from readily flowable liquids to slowly flowing liquids depending upon the viscosity of the various components employed in the reaction mixture and depending upon the amount of filler included in the reaction mixture. Regardless of the flow characteristics of the compositions and the proportions of the various ingredients, the compositions cure to a hard, tough silicone elastomer upon maintaining the compositions at the curing temperature for the required amount of time. The compositions are translucent or opaque and the colour of the cured product is a function of any added filler and the opacifying agents added to the compositions. When a halocarbon inhibitor, as above described, is used in the compositions of the present invention, the viscosity of the vinyl containing fluid can be increased up to 3,000,000 centistokes and still have a readily workable material.

All of the components of the composition are well known in the art. The vinyl chain-stopped organopolysiloxane component (1) is typified by various compositions within the scope of formula (1) where the monovalent hydrocarbon radicals represented by R and R' include alkyl radicals containing from one to 8 carbon atoms, e.g., methyl, ethyl, propyl, butyl and octyl radicals; mononuclear aryl radicals, e.g., phenyl, tolyl and xylyl radicals; cycloalkyl radicals containing 5 to 7 ring carbon atoms, e.g., cyclohexyl and cycloheptyl radicals, mononuclear aryl $C_1$–$C_8$ alkyl radicals, e.g., benzyl and phenylethyl radicals.

Further examples of heat curable compositions include a self-bonding heat-vulcanizable silicone rubber composition comprising an organopolysiloxane polymer having a viscosity of at least 100,000 centipoise at 25° C. of the formula,

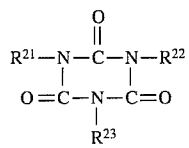  (7)

a curing catalyst and an additive selected from the class consisting of an alkenylisocyanurate of the formula,

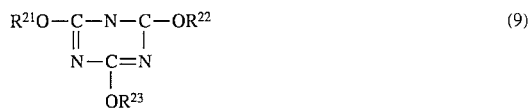  (8)

and a cyanurate of the formula,

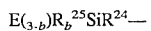  (9)

and mixtures thereof, where $R^{20}$ is selected from monovalent hydrocarbon radicals and halogenated monovalent hydrocarbon radicals, $R^{21}$ is selected from unsaturated monovalent hydrocarbon radicals and unsaturated halogenated monovalent hydrocarbon radicals, $R^{22}$ and $R^{23}$ are selected from R' radicals, saturated monovalent hydrocarbon radicals and saturated halogenated monovalent hydrocarbon radicals and a varies from 1.95 to 2.01, inclusive. In the above composition, there is preferably 82% to 99.65% by weight of the organopolysiloxane, 0.1% to 8% by weight of the curing catalyst and 0.25% to 10.0% by weight of the isocyanurate, based on the weight of the composition. There may further preferably be included in the composition a filler such as silica filler, which comprises 20% to 60% by weight of the organopolysiloxane and there may also be present a process aid which comprises 1% to 25% by weight of the organopolysiloxane. The curing catalyst is preferably t-butyl perbenzoate or dicumyl peroxide.

The self-bonding, curable silicone rubber components are mixed and heated to a temperature in the range of 80° C. to 650° C., so as to cure the resulting mixture to a silicone rubber mass.

In the above composition, a critical ingredient is the isocyanurate and cyanurate. The non-silicone isocyanurate or cyanurate is preferred since it has very good shelf-aging properties. If shelf-aging is not an important factor, then there may be used in place of the isocyanurate of Formula (8) or the cyanurate of Formula (9) above, an additive selected from the class consisting of a silylisocyanurate of the formula,

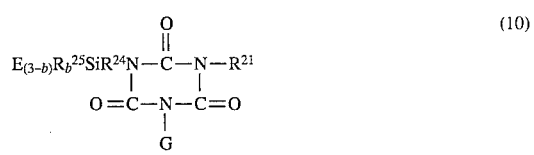  (10)

and a silylcyanurate of the formula,

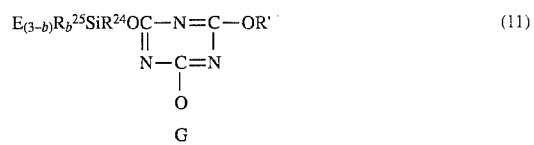  (11)

in the above formulas, $R^{21}$ is as defined previously, G is selected from $R^{21}$ radicals and radicals of the formula,

where E is selected from $R^{26}O-$ radicals and $R^{26}COO-$ radicals, where $R^{25}$ and $R^{26}$ are selected from monovalent hydrocarbon radicals and halogenated monovalent hydrocarbon radicals, $R^{24}$ is selected from divalent hydrocarbon radicals and halogenated divalent hydrocarbon radicals and b is a whole number equal to 0 to 3, inclusive. The silylisocyanurate and silylcyanurate of Formulas (10) and

(11) may have one silyl or two silyl substituent groups thereon on the isocyanurate moiety or cyanurate moiety, but preferably has only one silyl group thereon. Further, in the silylisocyanurates and silylcyanurates, preferably, G is represented by an R' radical, that is, an unsaturated monovalent hydrocarbon radical.

The curing of the silicone rubber composition can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers.

Especially suitable are the peroxides which may have the structural formulae,

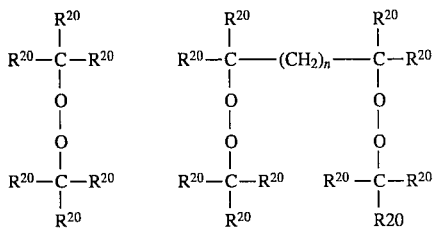

wherein $R^{20}$ represents the same alkyl group throughout or alkyl groups of two or more different types and n is zero or a positive integer.

Among the specific peroxidic curing catalysts that are preferred are di-tertiary-butyl peroxide, tertiary-butyltriethylmethyl peroxide, tertiary-butyl triphenyl methyl peroxide, t-butyl perbenzoate and a ditertiary alkyl peroxide such as dicumyl peroxide. Other suitable peroxidic catalysts which effect curing through saturated as well as unsaturated hydrocarbon groups on the silicon chain are aryl peroxides which include benzoyl peroxides, mixed alkyl-aryl peroxidic compounds which include tertiary-butyl perbenzoate, chloroaryl peroxides such as 1,4-dichlorobenzoyl peroxide; 2,4-dichlorobenzoyl peroxide and monochlorobenzoyl peroxide. From 0.1–8 per cent of said peroxidic compound by weight of the composition is used to cure the silicone rubber composition and preferably 0.5–3.0 percent by weight of the above curing catalyst, t-butyl perbenzoate, is preferred.

Other examples of heat curable compositions include a self-bonding, heat curable silicone rubber composition which comprises:

(a) from 82 to 99.65% by weight of a linear organopolysiloxane polymer having a viscosity of at least 100,000 centipoise at 25° C. and having the average unit formula:

$$(R^{30})_a SiO_{\frac{4-a}{2}} \quad (12)$$

(b) from 0.1 to 8% by weight of a curing catalyst, and (c) from 0.25 to 10% by weight of a self-bonding additive of the formula:

 (13)

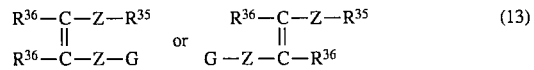

in which the formulae
a has a value of from 1.95 to 2.01 inclusive,
$R^{30}$ is a monovalent hydrocarbon or halohydrocarbon radical,
$R^{36}$ is alkyl or hydrogen, Z is phenylene or a group of the formula —CO—O—, —CO—, —CO—NH— or —CO—NR$^{32}$— in which R$^{32}$ is a monovalent hydrocarbon halohydrocarbon radical,
G is hydrogen, a saturated monovalent hydrocarbon or halohydrocarbon radical, or has the same meaning as $R^{35}$,
$R^{35}$ is an unsaturated monovalent hydrocarbon or halohydrocarbon radical, or a group of the formula:

 (14)

in which
$R^{34}$ is a divalent hydrocarbon or halohydrocarbon radical,
$R^{32}$ has the meaning given above,
M is a group of the formula $R^{33}O$— or $R^{33}$—CO—O— in which $R^{33}$ a monovalent hydrocarbon or halohydrocarbon radical, and
n is O or a whole number from 1 to 3.

The above composition preferably comprises 1% to 25% by weight, based on the organopolysiloxane of a process aid. There may also be present from 10 to 100% by weight, preferably 20 to 60% by weight, based on the organopolysiloxane, of a filler, preferably silica, In addition, there of course can be any of the other ingredients and additives normally to be found in heat-curable silicone rubber compositions.

In the above formulae, that is, formulae (12) to (14), the radicals $R^{30}$, $R^{32}$ and $R^{33}$ may be aryl radicals and halogenated aryl radicals such as phenyl, chlorophenyl, xylyl or tolyl, aralkyl radicals, such as phenethyl, or benzyl; aliphatic, haloaliphatic and cycloaliphatic radicals such as alkyl, alkenyl, cycloalkyl, haloalkyl, including methyl, ethyl, propyl, chlorobutyl, or cyclohexyl. Preferably, the $R^{30}$ radical is represented by methyl and phenyl radicals, where at least 50% of the $R^{30}$ radicals are methyl. Further, in the organopolysiloxane polymer represented by formula (12), there is preferably 0.1 to 0.6 weight per cent of the polymer of vinyl radicals. Further, preferably the $R^{32}$ and $R^{33}$ radicals are alkyl radicals of not more than 8 carbon atoms and are preferably methyl or ethyl. The $R^{36}$ radical is selected from hydrogen and alkyl radicals of preferably up to 10 carbon atoms. Preferably, the $R^{36}$ radical is hydrogen. Radicals represented by $R^{35}$ are alkenyl radicals, cycloalkenyl radicals and arylalkenyl radicals, such as vinyl, allyl, cyclohexyl, and phenyl-2-propenyl. In addition, the $R^{35}$ radicals may be represented by alkynyl radicals, such as propargyl. It is preferred that $R^5$ be either vinyl or allyl or an alkenyl radical of less than 8 carbon atoms. The $R^{32}$ radical (when $R^{35}$ is a group of the formula $R^{34}$—$SiR_n^{32}(M)_{3-n}$) may be saturated monovalent hydrocarbon radical or an unsaturated monovalent hydrocarbon radical and is preferably represented by the radicals recited in the exemplification of the $R^{30}$, $R^{32}$ and $R^{33}$ radicals, However, more preferably, the $R^{32}$ radical is selected from unsaturated monovalent hydrocarbon radicals and halogenated unsaturated monovalent hydrocarbon radicals such as alkenyl radicals of up to 8 carbon atoms. It is preferred that G be an unsaturated monovalent hydrocarbon radical. When $R^{35}$ represents a group of the formula —$R^{34}$—$SiR_a^{32}(M)_{3-n}$, it is preferable that G be an unsaturated monovalent hydrocarbon radical e.g. an alkenyl radical of up to 8 carbon atoms or arylene radical. It is preferable that Z be a carboxyl radical, since when Z has the other meanings enumerated above, these compounds are more difficult to synthesize. In formulae (13), both the cis and trans isomers have been shown and are intended to be covered. Any of the isomers of the maleates, and fumarates and the silylmaleates and silylfumarates disclosed or mixtures of the isomers may be used. In addition, single compounds may be used or a mixture of any of the self-bonding additives. Radicals included by $R^{34}$ are divalent saturated and unsaturated hydrocarbon radicals such as alkenyl, alkenylene, alkynylene and arylene radicals, which are exemplified by ethylene, trimethylene, tetramethylene, phenylene, and ethylene-phenylene. The radical $R^{34}$ may have 2 to 20 carbon atoms, and is preferably ethylene.

Maleates coming within the scope of formula (13) are diallylmaleate, dipropenylmaleate, and dibutenylmaleate. The preferred silylmaleates coming within the scope of these formulae are bis-trimethoxysilylpropylmaleate and bis-trimethoxysilylbutylmaleate. The preferred compounds within the scope of formulae (13) are as follows:

bis-trimethoxysilylpropylmaleate
diallyl fumarate
allyl hydrogen maleate
bis-(3-chloropropenyl) maleate
ethyl allyl fumarate
diisopropenyl fumarate
bis-trimethoxysilylpropyl fumarate
bis-dimethoxymethylsilylpropyl maleate
trimethoxysilylpropyl allyl fumarate
bis-ethoxydimethylsilylpropenyl maleate.

There are also within the scope of formula (12) polydiorganosiloxanes which can be copolymers containing two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units as well as copolymers of dimethylsiloxane units, methylvinylsiloxane units and diphenylsiloxane units.

The curing of the silicone rubber composition invention can be effected by any of the conventional curing agents. The preferred curing agents are organic peroxidic compounds conventionally used to cure silicone elastomers as described above.

There may be incorporated into the organopolysiloxane a filler which may be of the reinforcing filler type or of the semi-reinforcing type. Generally, the reinforcing fillers having 100–300 square meter surface areas per gram while the semi-reinforcing fillers having a surface area of 1–20 square meters per gram.

The reinforcing fillers may be added when it is desired to have a high strength silicone rubber composition, that is, a composition with high values for tensile strength and percent elongation. Illustrative of the many fillers which can be employed are lithopone, zinc oxide, zirconium silicate, silica aerogel, iron oxide, diatomaceous earth, fumed silica, precipitated silica, glass fibers, magnesium oxide, chromium oxide, zirconium oxide, aluminum oxide, crushed quartz, calcined clay, asbestos, cork, cotton and synthetic fibers. There can also be used silica filler treated with an organosiloxane cyclic trimer or tetramer such that the filler is hydrophobic. Generally, there may be added to said organopolysiloxane, 5 to 300% by weight of filler and preferably 10–200% by weight.

An essential feature of the composition is the opacifier. Any opacifying agents can be used although the preferred opacifying agents are one or more of titanium dioxide, carbon black and calcium carbonate. The opacifier is present in an amount of 0.1% to 35% by weight of the organopolysiloxane, preferably the amount of opacifier will vary according to the shade of glass required. For example, if a black opaque glass is required, it is preferred that from 0.1 to 3% by weight based on the weight of the polysiloxane of carbon black is used. If a grey opacifier is required a mixture of carbon black and titanium dioxide may be used in a ratio of between 1:10 and 1:100 by weight of carbon black:titanium dioxide and preferably in an amount of 1 to 25% by weight. Titanium dioxide can be used in an amount of 1 to 25% by weight all based on the weight of the organopolysiloxane.

The present invention provides a method of coating surface of a translucent material to stop light transmission by the translucent material which method comprises applying a composition comprising an organopolysiloxane and an opacifier and curing the composition.

Any of the organopolysiloxanes described may be used for the opacifying coating of the present invention.

The method of the present invention relates to the coating of translucent materials. Many types of translucent material can be coated such as polymethylmethacrylate, polystyrene, polycarbonate, and glass, particularly solar reflecting glass. Glass is a particular material which causes difficulty because of problems of bonding any form of coatings with the glass. As glass is an inorganic material, the opacifying coating is thought to bond physically with the material, i.e. adhere to its surface. This type of adherence is subjected to the ravages of UV light when the glass is to be the exposed material and the opacifying coating is then on the inside of the glass. The opacifying coating has good bonding properties to glass.

The present invention also provides a translucent material and in particular glass when coated by a method as described above. In particular, the present invention provides a cladding material comprising a translucent material as the portion exposed to the elements and the opacifying coating as the inner portion of the cladding.

In carrying out the method of the present invention, the translucent material, particularly glass, is preferably cleaned in a washing machine using demineralised water. Because of the problems relating to bonding of the opacifying coating, i.e. the bond being exposed to UV light a large temperature variations, the glass should be thoroughly cleaned without the use of alkali. Following cleaning, the glass is preferably wiped with a solvent such as methyl ethyl ketone or isopropanol. If a plastics translucent material is to be cleaned prior to application of the opacifying coating then care must be taken in the selection of cleaning solvents to prevent damage to the translucent material.

The application of the opacifying coating can be performed in a number of different ways. The essential feature is that the composition is thoroughly mixed so that the curing agent, the opacifying agent and the catalyst are uniformly dispersed with the other components of the silicone composition. Preferably the curing agent and the catalyst are separate from the remaining components of the silicone composition. In a two part form, the components are mixed in a spray gun and are sprayed onto the glass, the glass being generally in sheet or panel form.

The opacifying coating of the present invention can be applied to a number of different types of glass including clear colourless glass, solar reflecting glass, mirror glass and glass for fire walls. The opacifying coating of the present invention can provide a consistent, even, homogenous coating on glass and can therefore provide suitable coatings for external mirror glass.

The present invention will be further described with reference to the following examples in which all parts are by weight unless otherwise stated.

EXAMPLES 1–3

Organopolysiloxane compositions are prepared as follows:

| Components | Parts by Weight | | |
|---|---|---|---|
| | Example 1 | Example 2 | Example 3 |
| Base Material | | | |
| Dimethyl silanol terminated polysiloxane (blended to 9000 ± 1000 cps) | 100 | 100 | 100 |
| Ground silica | 137 | 137 | 137 |
| Hydrogenated caster oil | 1.60 | 1.60 | 1.60 |
| Hydrocarbon solvent | 65.4 | 64.0 | 64.0 |
| Titanium dioxide | 22.6 | 15.0 | — |
| Carbon black | — | 1.0 | 1.0 |
| Curing Agent | 1:10 (by volume) | 1:10 (by volume) | 1:10 (by volume) |
| Catalyst - alkylsilicate | | | |
| Properties (Example 1–3) | | | |
| Temperature resistance | −50° C. | | |
| Tensile strength | 3.5–40 N/mm$^2$ (ASTM-412) | | |
| Heat Agency | after 26 weeks at 82° C., no change, within the limits of test error, is tensile strength or elongation | | |
| UV resistance | No cracking, checking or pinholes (ASTM-526-70, 5° C.) | | |
| Water absorption | 7 days at 24° C. < 0.5% by weight (ASTM-D-570) | | |

Each of the above compositions, Examples 1 to 3, were coated onto a glass surface as follows. A two component airless spray gun, a King 45:1, was loaded with the base material and a pressure pot was loaded with the curing agent. Cool light glass was washed in demineralised water free of alkalis in an insulating glass washing machine. The glass was wiped with isopropanol. The glass was placed in a vertical position and sprayed to a thickness of 250 microns with the base material and curing agent in a volume ratio of 10:1. The coverage of the material was 0.72 Kg/m$^2$. The coatings cured to a tack free condition in 10 to 15 minutes and could be handled within 3 to 4 hours.

The composition of example 1 was coated onto solar reflecting glass as indicated above and samples were exposed, uncoated face, to daylight, for 20 months. No peeling, fading or degradation of the coating was noted.

What is claimed is:

1. A method of opacifying a spandrel glass surface, which is intended to be on the interior of a building, to stop light transmission by the glass which method comprises applying to the surface, which is intended to be on the interior of the building, a coating composition comprising an ultraviolet light resistant organopolysiloxane and an opacifier, wherein the opacifier is a mixture of carbon black and titanium dioxide present in the amount of 1 to 25% by weight and in a ratio of between 1:10 and 1:100 by weight carbon black::titanium dioxide, in an amount sufficient to provide to the surface sufficient opacity to light transmission, and curing the coating composition on the surface whereby the bond at the interface between the coating composition and the surface maintains its bond strength without peeling, fading or degradation after exposure to daylight for at least 20 months.

2. The method of claim 1 wherein the ultraviolet light resistant organopolysiloxane is a curable silicone rubber.

3. The method of claim 2 wherein the curable silicone rubber is self-bonding.

4. A method of opacifying a spandrel glass surface, which is intended to be on the interior of a building, to stop light transmission by the glass which method comprises applying to the surface, which is intended to be on the interior of the building a coating composition, comprising an ultraviolet light resistant organopolysiloxane and an opacifier selected from the group consisting of titanium, carbon black and calcium carbonate, in an amount to provide to the surface consistent opacity to light transmission, and curing the coating composition on the surface whereby the bond at the interface between the coating composition and the surface maintains its bond strength without peeling, fading or degrading after exposure to daylight for at least 20 months.

5. A method as claimed in claim 4 wherein the opacifier is carbon black present in an amount of 0.1 to 3% by weight of the organopolysiloxane.

6. A method as claimed in claim 4 wherein the opacifier is titanium dioxide present in an amount of 1 to 25% by weight of the organopolysiloxane.

7. The method of claim 4 wherein the ultraviolet light resistant organopolysiloxane is a curable silicone rubber.

8. The method of claim 7 wherein the curable silicone rubber is self-bonding.

* * * * *

UNITED STATES PATENT AND TRADEMARK OFFICE
CERTIFICATE OF CORRECTION

PATENT NO.    : 5,576,054

DATED         : November 19, 1996

INVENTOR(S)   : Peter Brown

It is certified that error appears in the above-identified patent and that said Letters Patent are hereby corrected as shown below:

On the title page of the patent, the Related U.S. Application Data is incorrectly listed as which is a continuation of Ser. No. 116,741, March 2, 1988, abandoned; it should read: is a continuation of Ser. No. 166,741, Mar. 2, 1988, abandoned.

Signed and Sealed this

Twenty-fifth Day of March, 1997

*Attest:*

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO. : 5,576,054

DATED : November 19, 1996

INVENTOR(S) : Peter BROWN

It is certified that error appears in the above-indentified patent and that said Letters Patent is hereby corrected as shown below:

Title page, column 1, item [54], the title should read --SPANDREL GLASS OPACIFYING METHOD--.

Signed and Sealed this

Sixth Day of January, 1998

Attest:

BRUCE LEHMAN

*Attesting Officer*     *Commissioner of Patents and Trademarks*